Dec. 18, 1934.　　　R. J. BRITTAIN, JR　　　1,984,824
JOURNAL BOX AND FRAME CONNECTION
Filed Dec. 5, 1931　　　4 Sheets-Sheet 1

INVENTOR:
RICHARD J. BRITTAIN, JR,
BY
HIS ATTORNEY.

Dec. 18, 1934.    R. J. BRITTAIN, JR    1,984,824
JOURNAL BOX AND FRAME CONNECTION
Filed Dec. 5, 1931    4 Sheets-Sheet 2

INVENTOR:
RICHARD J. BRITTAIN, JR.,
BY
HIS ATTORNEY.

Dec. 18, 1934.   R. J. BRITTAIN, JR   1,984,824
JOURNAL BOX AND FRAME CONNECTION
Filed Dec. 5, 1931   4 Sheets-Sheet 4

INVENTOR:
RICHARD J. BRITTAIN, JR.,
BY
HIS ATTORNEY.

Patented Dec. 18, 1934

1,984,824

UNITED STATES PATENT OFFICE 1,984,824

JOURNAL BOX AND FRAME CONNECTION

Richard J. Brittain, Jr., Bloomfield, N. J., assignor to General Motors Corporation, Detroit, Mich., a corporation of Delaware Application December 5, 1931, Serial No. 579,257

4 Claims. (Cl. 105—223)

This invention relates to journal box and frame connections and comprises all the features of novelty herein disclosed. An object of the invention is to provide an improved tilting connection between a journal box and a frame. Another object is to provide an improved yoke or saddle for transferring load from a frame to a journal box.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a sectional view of the box and yoke in the vertical plane of the axle center.

Figure 1:
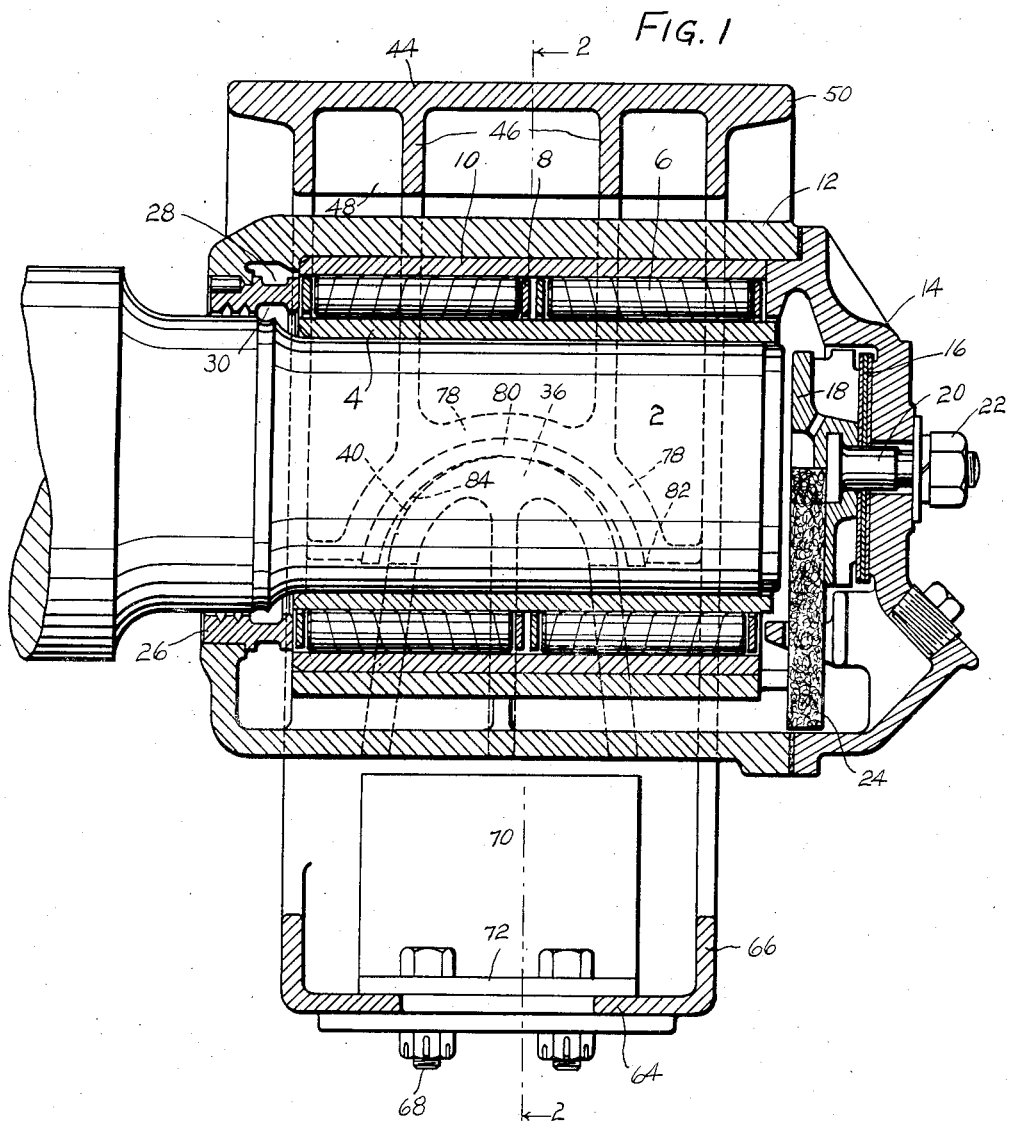

In the illustrated embodiment of the invention, a shaft or axle 2 carries a raceway sleeve 4 for two sets of roller bearings 6 having end rings 8. The rollers run in an outer raceway sleeve 10 inserted in the bore of an axle box or housing 12. The outer end of the box is closed by an end cap 14 which carries a set of spacing plates 16 and a thrust block 18, the latter opposing the end of the axle. The thrust block is secured by a stud 20 and a nut 22 to the end cap and is slotted to receive a lubricating wick 24. The opposite or inner end of the box is closed by a sealing bushing 26 having an external lubricant relief groove 28 and an internal collecting groove 30. The foregoing is not per se a part of the present invention.

Projections 36 extend laterally from opposite sides of the box and are braced by webs or flanges 38. The upper portion of each projection has a crowned face or seat 40 which is preferably arcuate longitudinally of the box and chilled or otherwise hardened. Above the face 40, the box has a vertical flat face 42 which is chilled or otherwise hardened for engagement with an opposed flat face on a yoke 44 which surrounds the box and rocks on the face 40. The top of the yoke clears the top of the box; it is reinforced internally by longitudinally extending webs or flanges 46 and a cross web 48 and has external reinforcing side flanges 50. The yoke has substantially vertical legs 54 on the outside of which are welded channel shaped wear plates 56 in which slide the usual car frame pedestals (not shown). The lower ends of the legs are connected to extensions 58 having side walls 60 forming recesses to receive the usual coil springs (not shown) for supporting the pedestals. The walls 60 are braced by side cheeks 62 having outwardly extending flanges 63. The bottom of the yoke is formed by an integral wall 64 having vertical side flanges 66. Removably secured by bolts 68 to the wall 64 are angle irons having a vertical web 70 and a horizontal web 72. The webs 70 form retainers or safety stops to prevent accidental separation of the crowned seat 40 of the box from a concave seat on the yoke as will appear.

Figure 2:
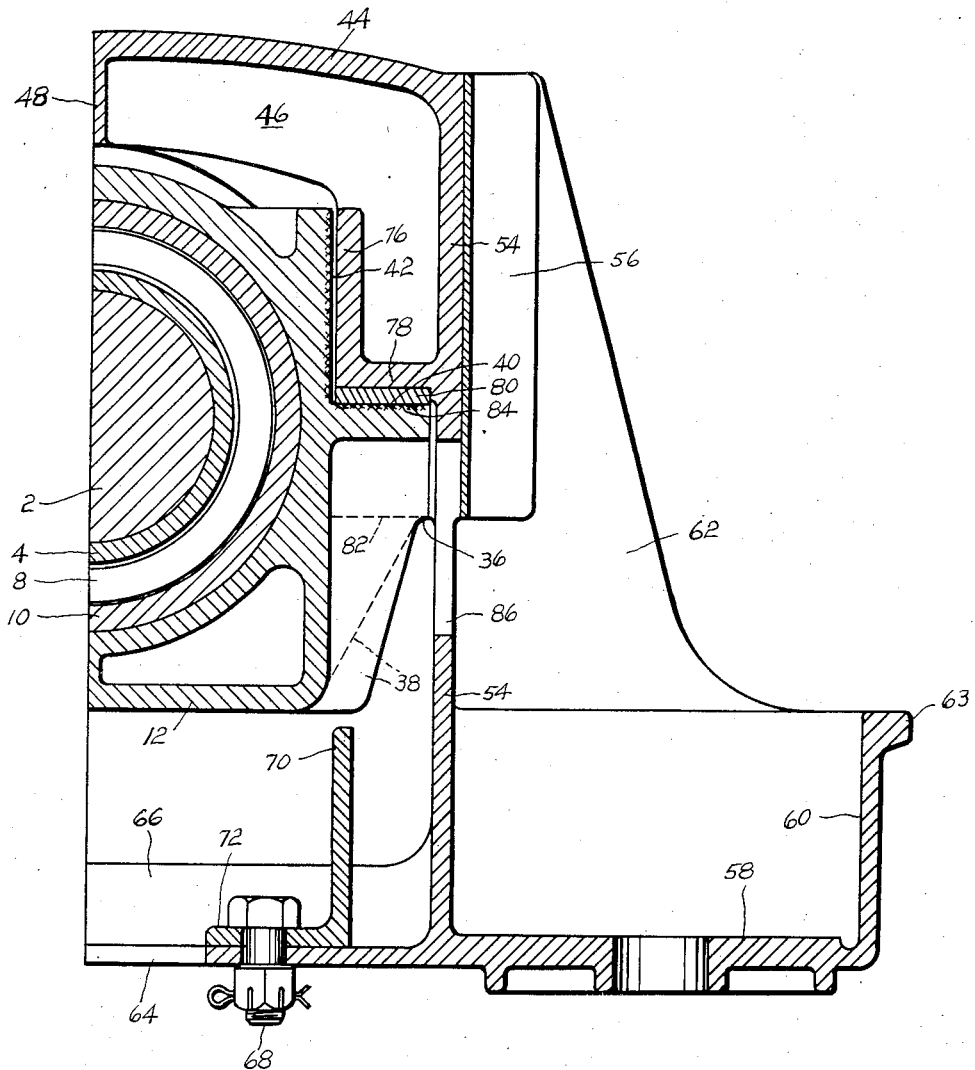
Fig. 2 is a sectional view approximately on line 2—2 of Fig. 1.
Figure 3:
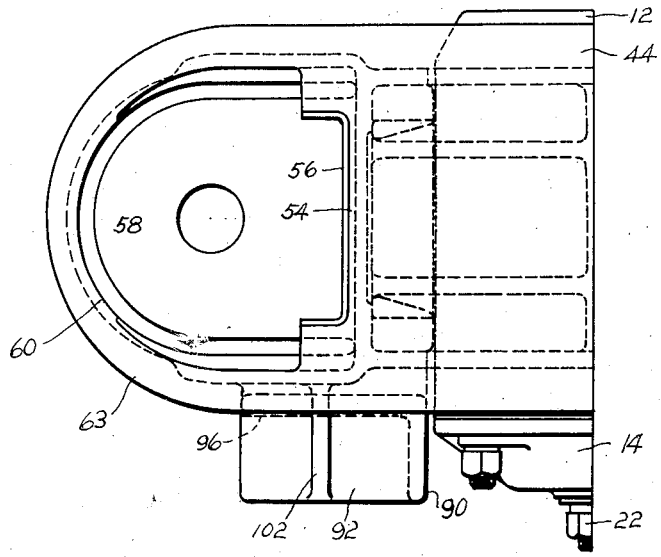
Fig. 3 is a plan view of one half of the box and the yoke.
Figure 4:
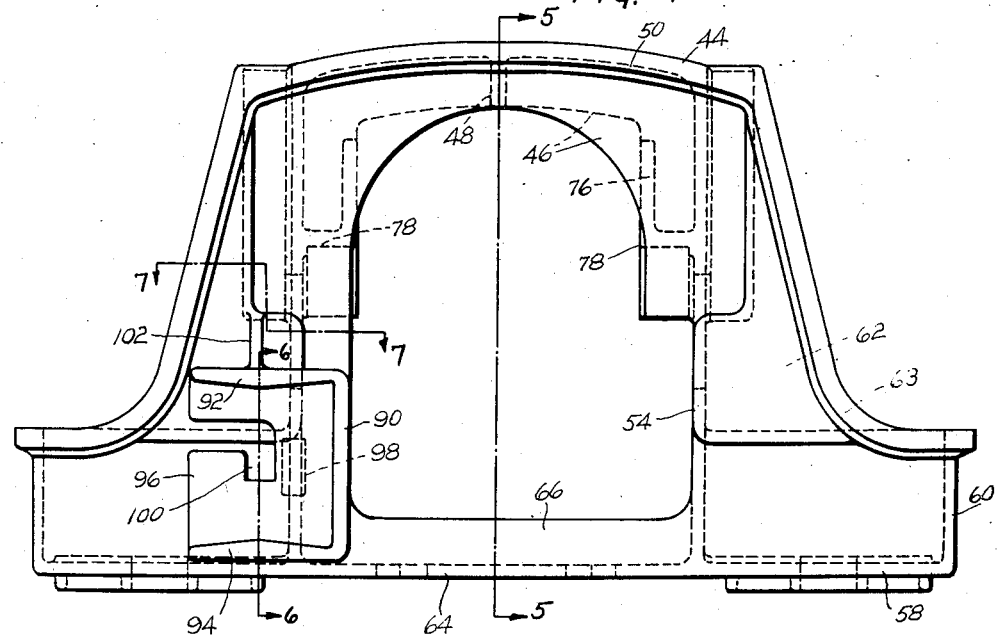
Fig. 4 is side elevation of the yoke.
Figure 5:
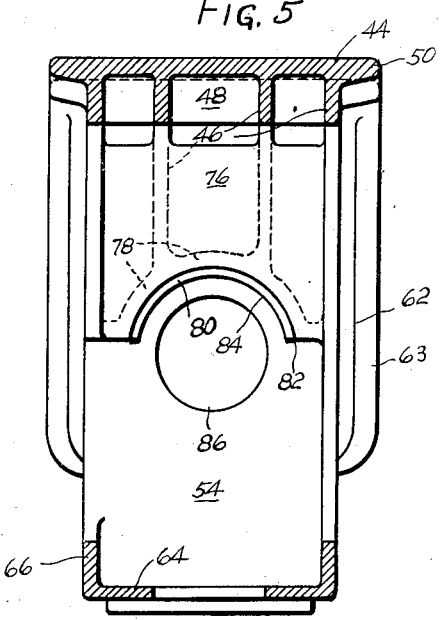
Fig. 5 is a sectional view approximately on the line 5—5 of Fig. 4.
Figure 6:
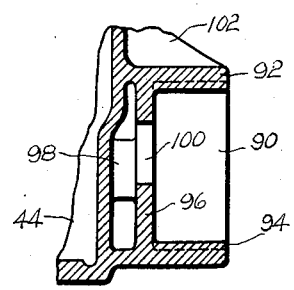
Fig. 6 is a sectional view approximately on the line 6—6 of Fig. 4.
Figure 7:
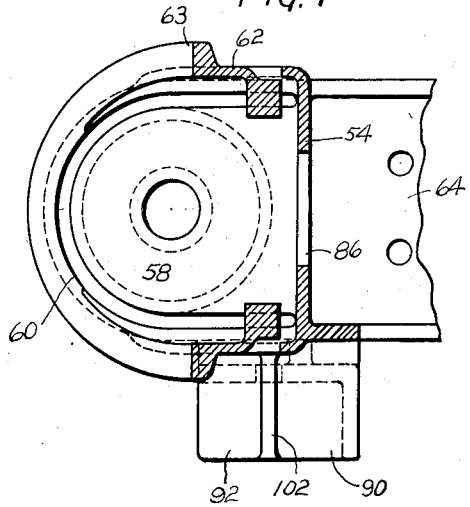
Fig. 7 is a sectional view approximately on the line 7—7 of Fig. 4.
Figure 8:
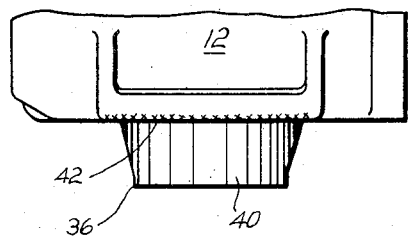
Fig. 8 is a plan view of a portion of the box.
Figure 9:
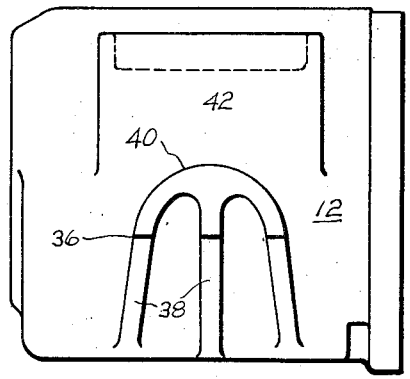
Fig. 9 is a side view of Fig. 8.
Figure 10:
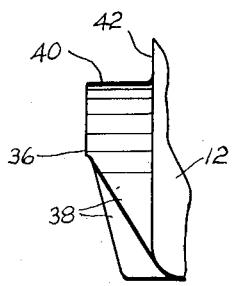
Fig. 10 is an end view of a portion of the box.

The internal yoke flanges 46 are connected at each end by a vertical web 76 and by an arcuate web 78, the former presenting a flat face to the hardened wall 42 of the box and thereby preventing relative shifting of the box and yoke crosswise of the axle. The web 78 forms an internal projection on the yoke and its lower face has a cylindrically concave seat with a sheet metal seat plate or liner 80 secured to it, as by welding at the ends 82. The internal face 84 of the seat plate 80 is preferably cylindrically curved longitudinally of the box and is of slightly larger radius than the cylindrically crowned seat 40 of the box. This is to allow a limited free rocking movement between the box and the yoke longitudinally of the axle but always retains the box and the yoke in assembled relation in spite of any thrust transferred from the axle to the box. The engaging seats are self-centering although the center of curvature is preferably a little to the left or inside of the middle of the roller bearings, as appears in Fig. 1, to diminish the chance of overload on the outer set of bearings. Openings 86, which are preferably circular and concentric with the center of curvature of the concave seat, are provided in the yoke legs 54 to permit easy access of a finishing tool in order to finish the seat. Removal of the bolts 68 and shifting of the retainers 70 along the bottom wall 64 towards the legs 54 will allow the box to be disengaged from its seat in the yoke by a relative vertical displacement of the yoke and the box, the spaces between the yoke legs 54 and the flanges 38 receiving the web 70 and the clearance between the bottom of the yoke and the bottom of the box being greater than the depth of the concave seat. The yoke and the box can then be entirely disengaged by relative lateral movement lengthwise of the axle because it will be seen, by comparing Figs. 2, 5 and 7, that the rear flange 66 of the bottom wall 64 merges at its ends with the side legs 54 well down near the lower ends of the latter and so presents no obstruction to the passage of the box projections 36 rearwardly out of the yoke. Otherwise stated, at least one side of the yoke is open below the webs 78 for the full width of the box including its projections so that the box can be moved horizontally into and out of seating alignment with the yoke. The clearance between the retainer and the bottom of the box is of course less than the depth of the concave seat, the curvature of the latter preferably being of somewhat less extent than a semicylinder. There are no projections below the ends of the liners 80 so that the relative vertical movement needed to disengage the box and the yoke is limited to the radius of the liners. The central area of the engaging seats is arranged at the level of the center of the axle so that the load will not produce a tendency to tip the box and overload the bearings.

For third rail cars, one leg of the yoke is preferably cast integral with a collector beam bracket as shown in Figs. 3, 4, 6 and 7. This device comprises a vertical web 90, two spaced and internally crowned webs 92 and 94 and an inner wall 96 connected by a web 98 to the yoke. The wall 96 has an angular slot 100 and a web 102 braces the web 92.

I claim:

1. In a device of the character described, a journal box, an axle journalled in the box, the opposite sides of the box having lateral projections whose upper surfaces are curved longitudinally of the box, a yoke clearing the top of the box and having side legs at opposite sides of the box, a bottom wall connecting the legs, the legs having internal projections whose lower surfaces overlie the box projections and are curved longitudinally of the box, one set of surfaces being concave and the other convex, and a retaining member detachably carried by the bottom wall of the yoke and having a clearance with the bottom of the box, the clearance being less than the depth of the concavity, and the retaining member being shiftable out of retaining relation to the box while supported by the bottom wall; substantially as described.

2. In a device of the character described, a journal box, an axle journalled in the box, the opposite sides of the box having lateral projections whose upper surfaces are curved longitudinally of the box, a yoke clearing the top of the box and having side legs at opposite sides of the box, the legs having internal projections whose lower surfaces overlie the box projections and are curved longitudinally of the box, one set of surfaces being concave and the other convex to provide seats free to engage or disengage upon relative vertical movement, the yoke having a bottom wall connecting the legs and having a greater clearance with the bottom of the box than the depth of the concavity to provide for vertical and lateral disengagement of the box and the yoke, and a retaining member detachably carried by the bottom wall of the yoke and having a smaller clearance with the bottom of the box than the depth of the concavity; substantially as described.

3. In a device of the character described, a journal box having lateral projections, a yoke having side legs with inwardly extending projections supported on the box projections, the box projections having convex seats and the yoke projections having concave seats free to engage or disengage upon relative vertical movement, the concave seats being faced with substantially semicylindrical liners the ends of which constitute the ends of open sockets whereby the necessary relative vertical movement to displace the seats is limited to the radius of said cylindrical liners; substantially as described.

4. In a device of the character described, a journal box having lateral projections, a yoke having side legs and a bottom wall, the legs having inwardly extending projections supported on the box projections, the projections on one member being concave and on the other member convex to engage or disengage vertically, a retaining member to prevent said disengagement and supported by the bottom wall, there being a space between the yoke legs and the sides of the box to receive the retaining member when the latter is shifted laterally to provide for disengaging the box from the yoke; substantially as described.

RICHARD J. BRITTAIN, Jr.